US011987053B2

(12) United States Patent
Kunioka

(10) Patent No.: US 11,987,053 B2
(45) Date of Patent: May 21, 2024

(54) LIQUID DISCHARGE APPARATUS

(71) Applicant: Satoshi Kunioka, Kanagawa (JP)

(72) Inventor: Satoshi Kunioka, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 90 days.

(21) Appl. No.: 17/517,668

(22) Filed: Nov. 3, 2021

(65) Prior Publication Data

US 2022/0134744 A1 May 5, 2022

(30) Foreign Application Priority Data

Nov. 5, 2020 (JP) ................................ 2020-184854

(51) Int. Cl.
*B41J 2/145* (2006.01)

(52) U.S. Cl.
CPC .................................... *B41J 2/145* (2013.01)

(58) Field of Classification Search
None
See application file for complete search history.

(56) References Cited

U.S. PATENT DOCUMENTS 6,851,795 B2 * 2/2005 Watanabe ............ B41J 2/17526 347/50
9,156,275 B2 * 10/2015 Olsen .................. B41J 2/17513
2002/0041305 A1 * 4/2002 Tsukuda ............... B41J 2/17596 347/85
2009/0073213 A1 * 3/2009 Iwata ...................... B41J 11/48 347/19

FOREIGN PATENT DOCUMENTS

JP 2004-042417 2/2004
JP 2005-305780 11/2005
JP 2008-055733 3/2008

* cited by examiner

*Primary Examiner* — Alejandro Valencia
(74) *Attorney, Agent, or Firm* — XSENSUS LLP

(57) ABSTRACT

A liquid discharge apparatus includes a holder, a fixing member, multiple liquid dischargers, and multiple couplings. The fixing member is detachably attached to the holder. The multiple liquid dischargers are secured to the fixing member and arranged side by side in a vertical arrangement direction. The multiple liquid dischargers include respective liquid conveyors. The multiple couplings couple the respective liquid conveyors and respective liquid containers. One of the liquid conveyors of a lower one of the multiple liquid dischargers is longer in a direction intersecting the vertical arrangement direction than another one of the liquid conveyors of an upper one of the multiple liquid dischargers above the lower one.

16 Claims, 8 Drawing Sheets

LIQUID DISCHARGE APPARATUS

CROSS-REFERENCE TO RELATED APPLICATION

This patent application is based on and claims priority pursuant to 35 U.S.C. § 119(a) to Japanese Patent. Application No. 2020-184854, flied on. Nov. 5, 2020, in the Japan Patent Office; the entire disclosure of which is hereby incorporated b reference herein.

BACKGROUND

Technical Field

Aspects of the present disclosure relate to a liquid di large apparatus.

Description of the Related Art

A certain inkjet printer includes a printing device including a print head that discharges ink from a nozzle face to a recording medium.

SUMMARY

Embodiments of the present disclosure describe an improved liquid discharge apparatus that includes a holder, a fixing member, multiple liquid dischargers, and multiple couplings. The fixing member is detachably attached to the holder. The multiple liquid dischargers are secured to the fixing member and arranged side by side in a vertical arrangement direction. The multiple liquid dischargers include respective liquid conveyors. The multiple couplings couple the respective liquid conveyors and respective liquid containers. One of the liquid conveyors of a lower one of the multiple liquid dischargers is longer in a direction intersecting the vertical arrangement direction than another one of the liquid conveyors of an upper one of the multiple liquid dischargers above the lower one.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
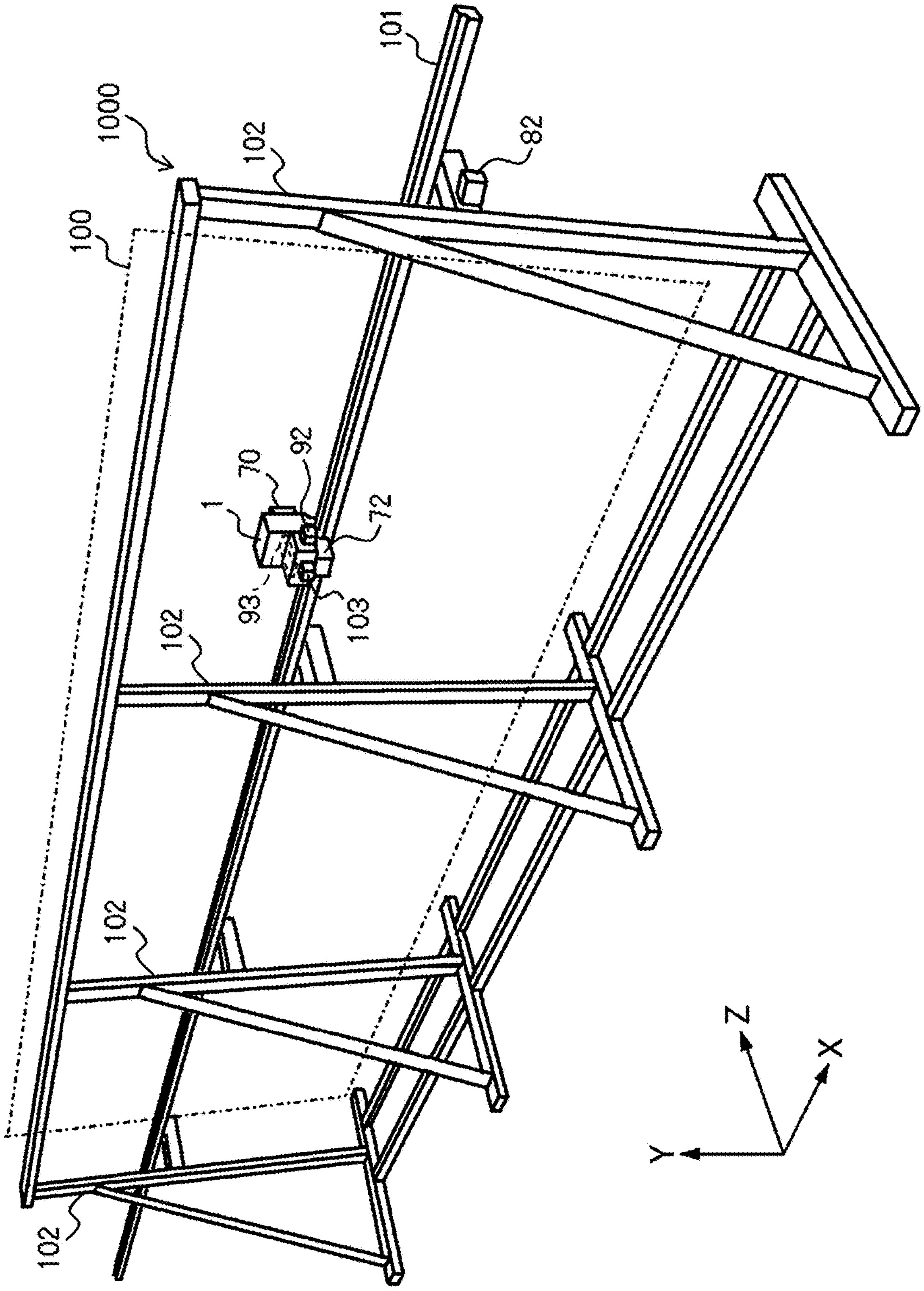
FIG. 1 is a perspective view of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a," "an," and "the" are intended to include the plural forms as well, unless the context clearly indicates otherwise.

Embodiments of the present disclosure are described below with reference to the drawings. FIG. 1 is a perspective view of a liquid discharge apparatus 1000 according to an embodiment of the present disclosure.

The liquid discharge apparatus 1000 is installed so as to face an object 100 on Which images are drawn. The liquid discharge apparatus 1000 includes an X-axis rail 101, a Y-axis rail 102 intersecting the X-axis rail 101, and a Z-axis rail 103 intersecting the X-axis rail 101 and the Y-axis rail 102, The Y-axis rail 102 movably holds the X-axis rail 101 along the Y-axis. The X-axis rail 101 movably holds the Z-axis rail 103 along the X-axis. The Z-axis rail 103 movably holds a carriage 1 along the Z-axis. The carriage 1 is an example of a liquid discharge unit.

Further, the liquid discharge apparatus 1000 includes a first Z-direction driver 92 and an X-direction driver 72. The first Z-direction driver 92 moves the carriage 1 along the Z-axis along the Z-axis rail 103. The X-direction driver 72 moves the Z-axis rail 103 along the X-axis along the X-axis rail 101. The liquid discharge apparatus 1000 further includes a Y-direction driver 82 that moves the X-axis rail 101 along the Y-axis along the Y-axis rail 102. Further, the liquid discharge apparatus 1000 includes a second Z-direction driver 93 that moves a head holder 70 relative to the carriage 1 along the Z-axis. The head holder 70 is an example of a holder.

The liquid discharge apparatus 1000 described above discharges ink from a head 300 (see FIG. 2) mounted on the head holder 70 while moving the carriage 1 along the X-axis, the Y-axis, and the Z-axis, thereby drawing images on the object 100. The ink is an example of liquid. The movement of the carriage 1 and the head holder 70 along the Z-axis may not be parallel to the Z-axis, and may be an oblique movement including at least a Z-axis component. Although the object 100 is flat in FIG. 1, the object 100 may have a surface shape which is nearly vertical or a curved surface with the large radius of curvature, such as a body of a car, a truck, or an aircraft.

Figure 2:
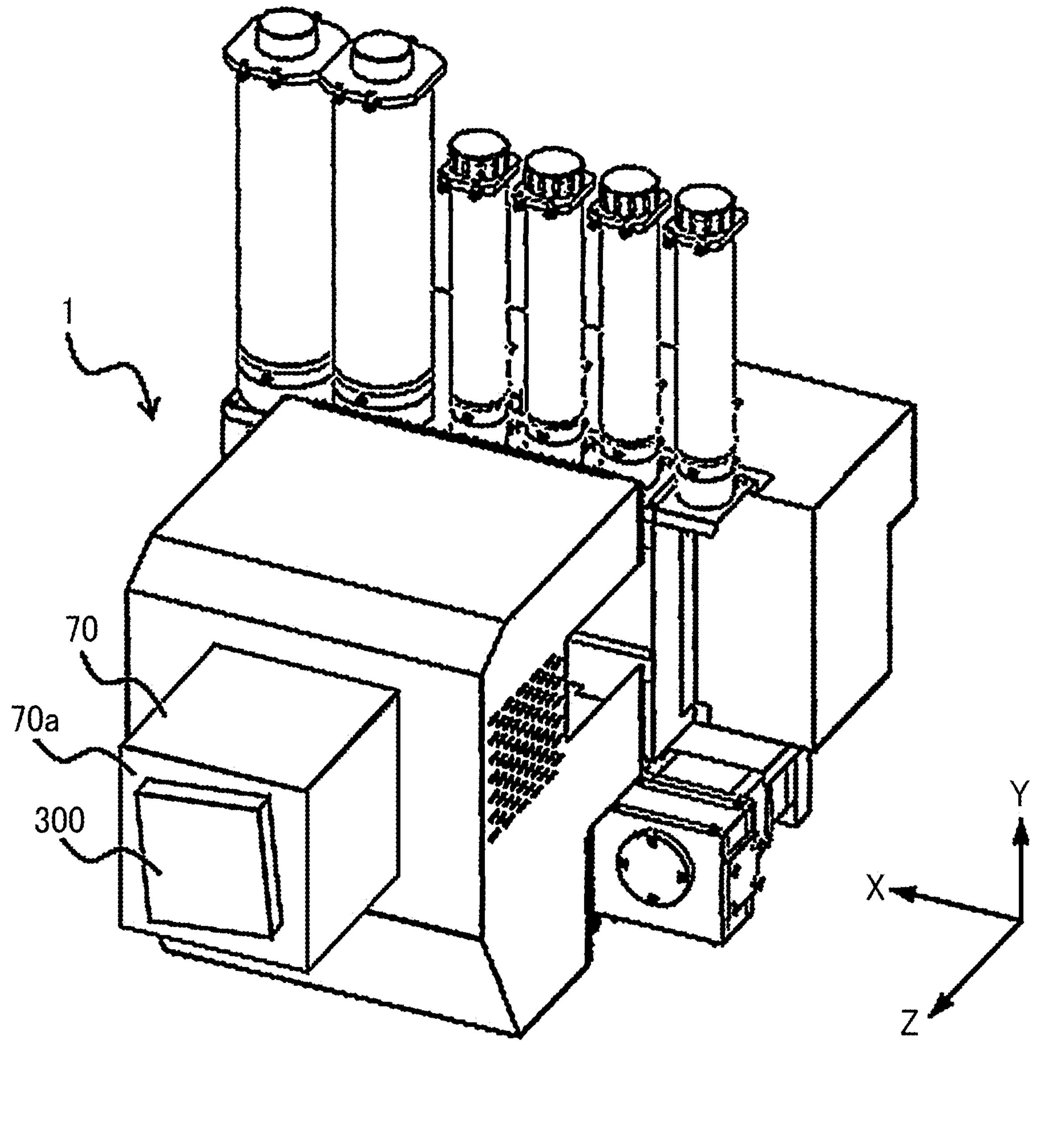
FIG. 2 is a perspective view of a carriage according to an embodiment of the present disclosure.

Next, the configuration of the carriage 1 is described. FIG. 2 is a perspective view of the carriage 1 according to the present embodiment. The carriage 1, which is an example of a liquid discharge unit, mounts the head holder 70, which is an example of a holder. The carriage 1 is movable along the Z-axis along the Z-axis rail 103 by driving force of the first Z-direction driver 92 illustrated in FIG. 1. Further, the head holder 70 is movable relative to the carriage 1 along the Z-axis by driving force of the second Z-direction driver 93 illustrated in FIG. 1, The head holder 70 includes a head fixing plate 70*a* for attaching a head 300. Here, the head 300 is an example of a liquid discharger, and the head fixing plate 70*a* is an example of a fixing member.

Figure 3:
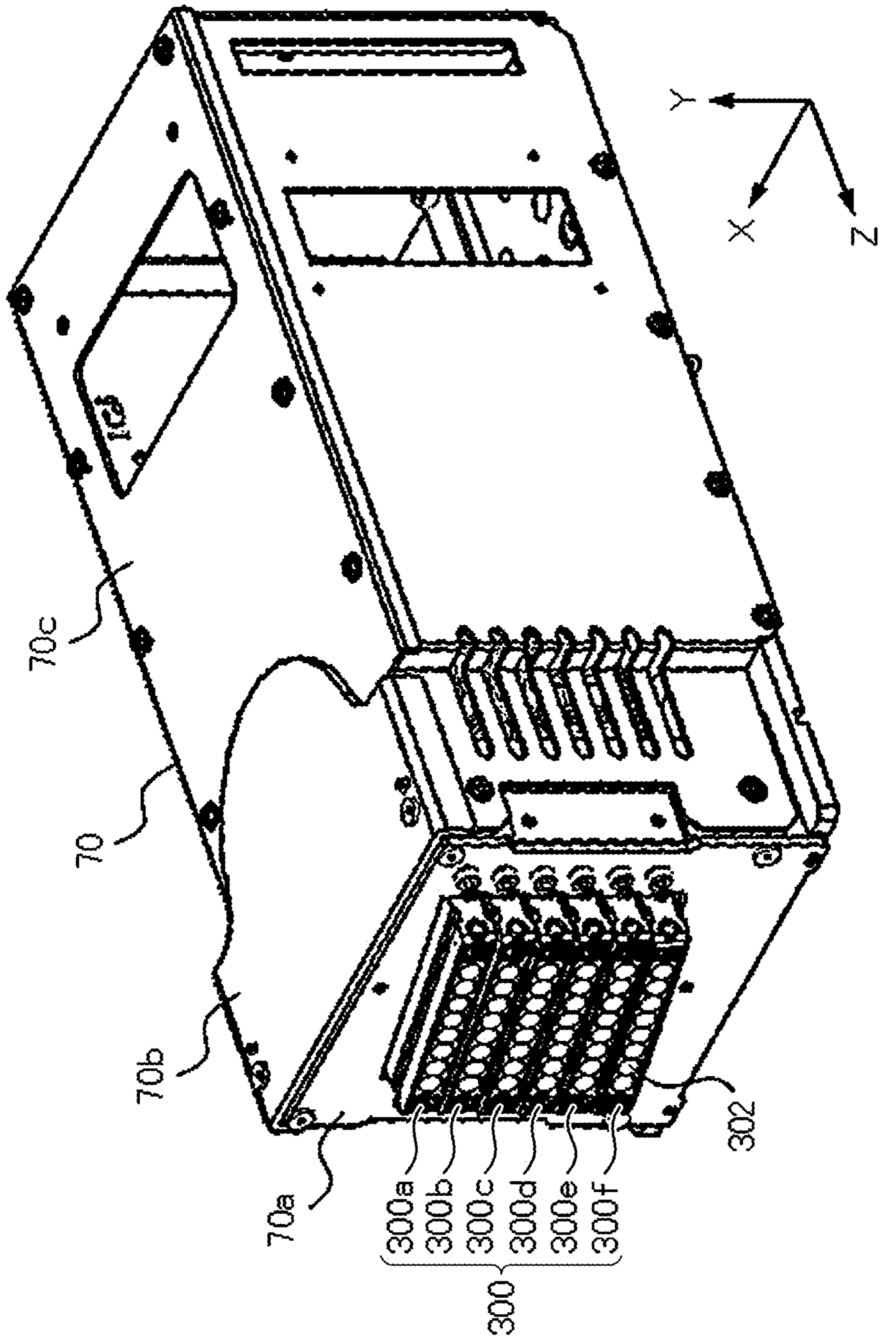
FIG. 3 is a perspective view of as head holder according to an embodiment of the present disclosure.

Next, the configuration of the head holder 70 is described in detail. FIG. 3 is a perspective view of the head holder 70 according to the present embodiment. The head holder 70 includes a frame 70*c*, an upper cover 70*b*, and the head fixing plate 70*a*, The frame 70*c* is assembled in a rectangular parallelepiped Shape. The upper cover 70*b* is closably openable with respect to (detachably attachable to) the frame 70*c*. The head 300 is secured to the head fixing plate 70*a.*

In the present embodiment, six heads 300*a* to 300*f* are arranged side by side on the head fixing plate 70*a* and stacked one on another. In the following description, these heads are collectively referred to as heads 300. Each of the heads 300 includes a plurality of nozzles 302, Ink used in the head 300 may be different color for each head 300 or may be the same color for all heads 300. The number of heads 300 is not limited to six, and may be more than six or less than six.

The heads 300 are secured to the head fixing plate 70*a* such that a nozzle row of each head 300 intersects the horizontal plane (i.e., X-Z plane) and the plurality of nozzles 302 is obliquely arrayed with respect to the X-axis as illustrated in F 3. Thus, the head 300 discharges ink from the nozzle 302 in a direction (Z-axis direction in the present embodiment) intersecting the direction of gravity. The upper cover 70*b* is an example of a cover.

Figure 4:
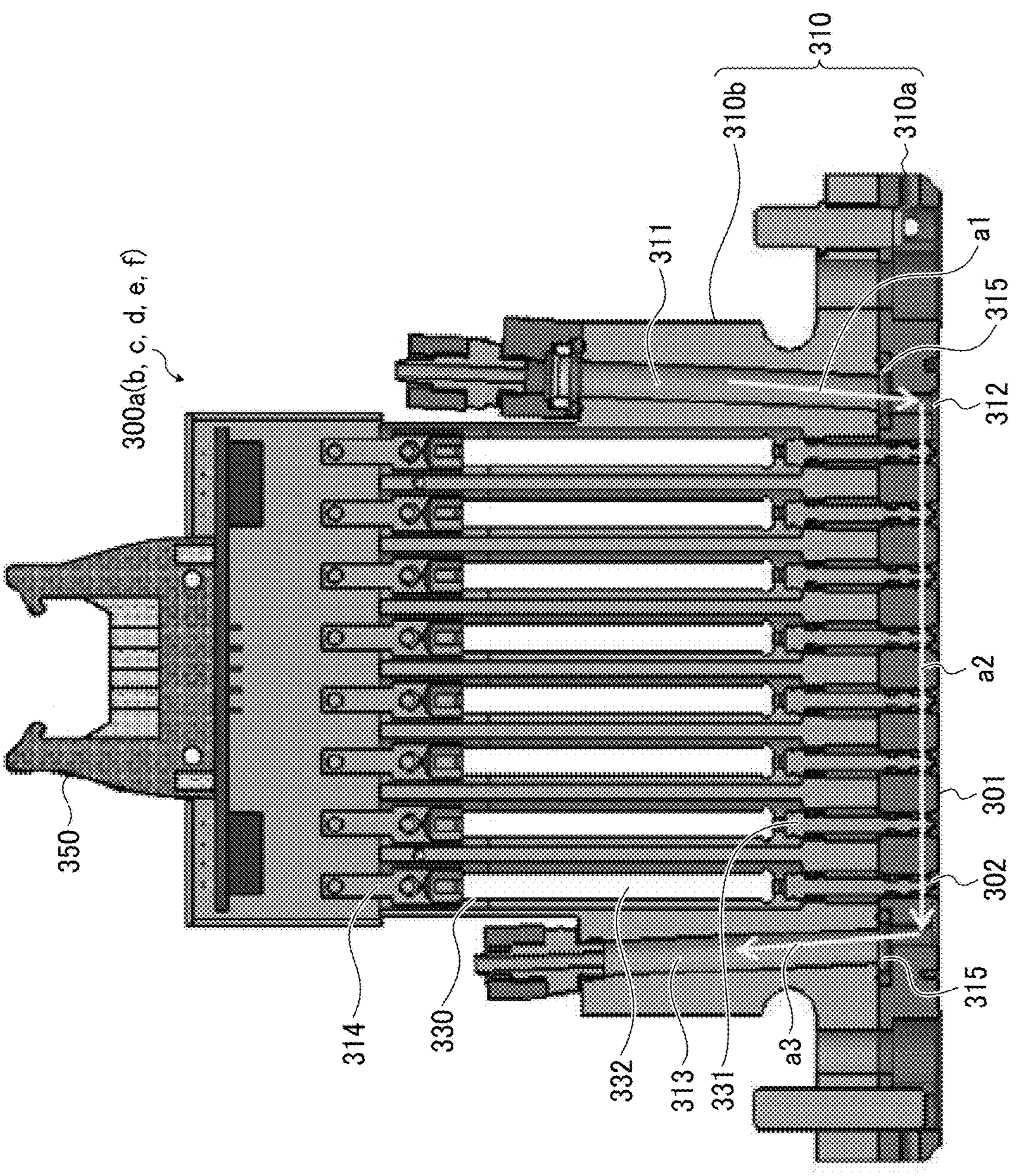
FIG. 4 is a cross-sectional vie of a head, according to an embodiment of the present disclosure.

FIG. 4 is a cross-sectional view of the head 300 according to an embodiment of the present disclosure. Each of the heads 300*a* to 300*f* illustrated in FIG. 3 includes a housing 310*a* and a housing 310*b* joined to the housing 310*a* as illustrated in FIG. 4. The housing 310*a* and the housing 310*b* are made of metals or resins. Both housings 310*a* and 310*b* may be formed of the same material, or one housing 310*a* or 310*b* may be formed of metals and the other housing 310*a* or 310*b* may be formed of resins. The housing 310*b* includes a connector 350 for communication of electric signals on an upper portion thereof. In the following description, the two housings 310*a* and 31411 may be collectively referred to as a housing 310.

The housing 310*a* holds a nozzle plate 301 having nozzles 302 to discharge ink. The housing 310*a* has a flow path 312 through which ink is fed from a supply port 311 to a collection port 313 via the nozzle plate 301. The housing 310*b* includes the supply port 311 and the collection port 313 that are connected to the flow path 312 of the housing 310*a*. Discharge modules 330 are disposed between the supply port 311 and the collection port 313 to discharge the ink in the flow path 312 from the nozzles 302. Each of the discharge modules 330 faces the corresponding nozzle 302 provided on the housing 310*a*. In this example illustrated in FIG. 4, eight discharge modules 330 correspond to eight nozzles 302 arranged in a row, respectively. The number and arrangement of the nozzles 302 and the discharge modules 330 are not limited to the above-described example. For example, the number of nozzles 302 and the discharge modules 330 may be one instead of two or more. Further, the nozzles 302 and the discharge modules 330 may be arranged in multiple rows instead of one row.

In FIG. 4, a seal 315 is disposed at a joint between the housing 310*a* and the housing 310*b*. In this example, the seal is an O-ring to prevent ink leakage from the joint between the housing 310*a* and the housing 310*b*. With the above-described configuration, the supply port 311 takes in the pressurized ink from the outside of the head 300, feeds the ink in the direction indicated by arrow a1, and supplies the ink to the flow path 312, The flow path 312 feeds the ink from the supply port 311 in the direction indicated by arrow a2. The collection port 313 collects the ink that has not been discharged from the nozzles 302 in the direction indicated by arrow a3.

The discharge module 330 includes a needle valve 331 that opens and closes the nozzle 302 and a piezoelectric element 332 that drives the needle valve 331. The housing 310*b* includes a regulator 314 at a position facing an upper end of the piezoelectric element 332. The regulator 314 contacts the upper end of the piezoelectric element 332 to form a secured point of the piezoelectric element 332.

In the above-described configuration, as the piezoelectric element 332 moves the needle valve 331 upward to open the nozzle 302 that has been closed by the needle valve 331, so that ink is discharged from the nozzle 302. As the piezo-electric element 332 moves the needle valve 331 downward, the tip of the needle valve 331 comes into contact with the nozzle 302 to close the nozzle 302, so that ink is not discharged from the nozzle 302.

Figure 5:
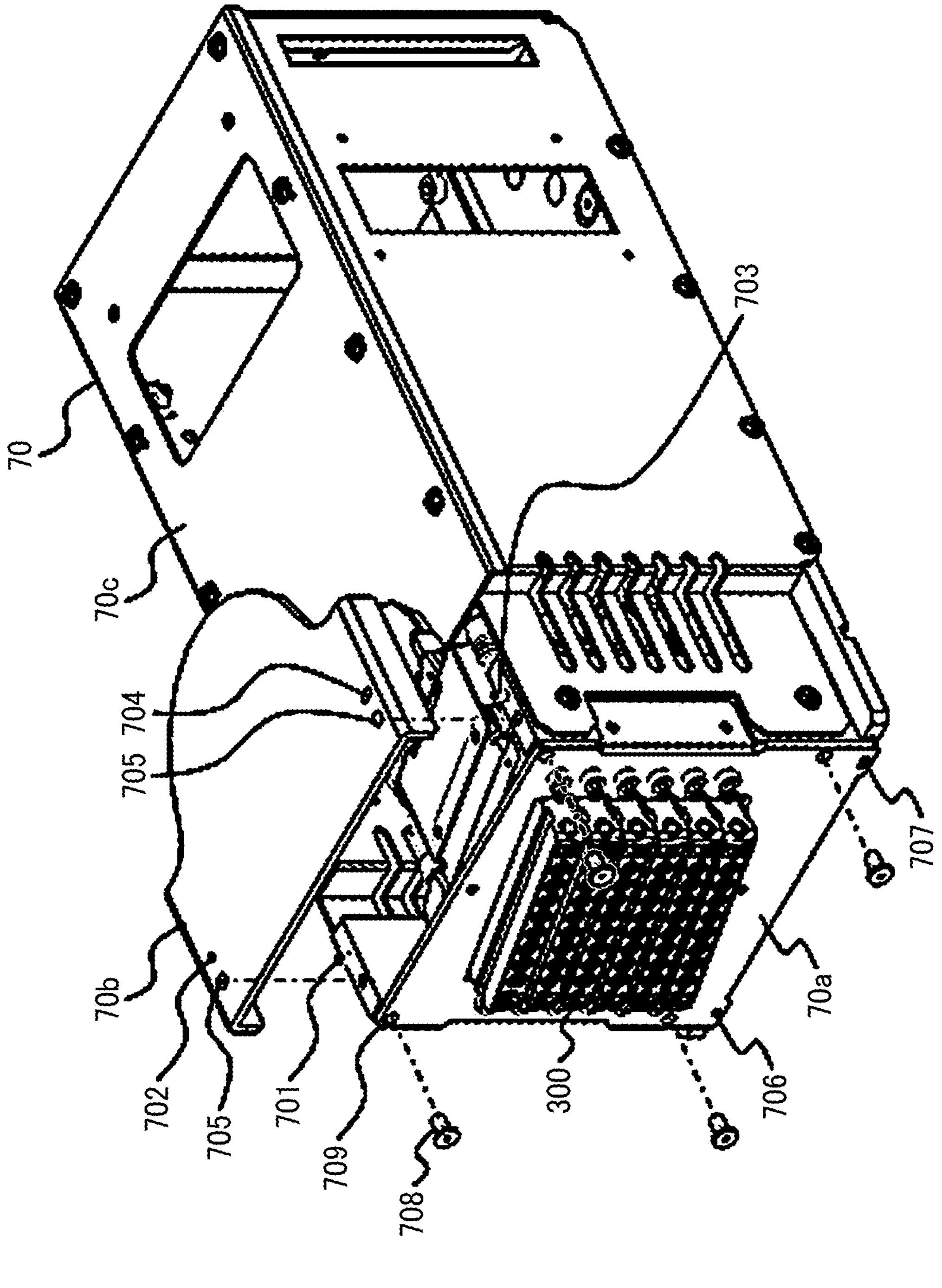
FIG. 5 is a perspective view of the head holder.

FIG. 5 is a perspective view of the head holder 70 according to the present embodiment when the upper cover 70*b* is open. In the head holder 70, the upper cover 70*b* has a hole 702 into which a pin 701 on the frame 70*c* fits and a hole 704 into which a pin 703 on the frame 70*c* fits. The upper cover 70*b* further has screw holes 705 to secure the upper cover 70*b* to the frame 70*c* with screws. The hole 702 that fits onto the pin 701 is a round hole to position the upper cover 70*b* with respect to the frame 70*c*. On the other hand, the hole 704 that fits onto the pin 703 is a slotted hole to absorb tolerances when the upper cover 70*b* is attached to the frame 70*c*.

As described above, in the head holder 70, the upper cover 70*b* is disposed facing the top head 300*a* among the heads 300 secured to the head fixing plate 70*a*. The upper cover 70*b* is closably operable with respect (detachably attachable) to the frame 70*c*. In addition, in the head holder 70, the head fixing plate 70*a* has a hole 706 and a hole 707 into which pins on the frame 70*c* fit. The head fixing plate 70*a* further has screw holes 709 to secure the head fixing plate 70*a* to the frame 70*c* with screws 708. Similarly to the upper cover 70*b*, the hole 706 of the head fixing plate 70*a* is a round hole to position the head fixing plate 70*a* with respect to the frame 70*c*. On the other hand, the hole 707 is a slotted hole to absorb tolerances when the head fixing plate 70*a* is attached to the frame 70*c*. Thus, the head holder 70 is provided so that the head fixing plate 70*a* is detachably attachable to the frame 70*c*.

Figure 6:
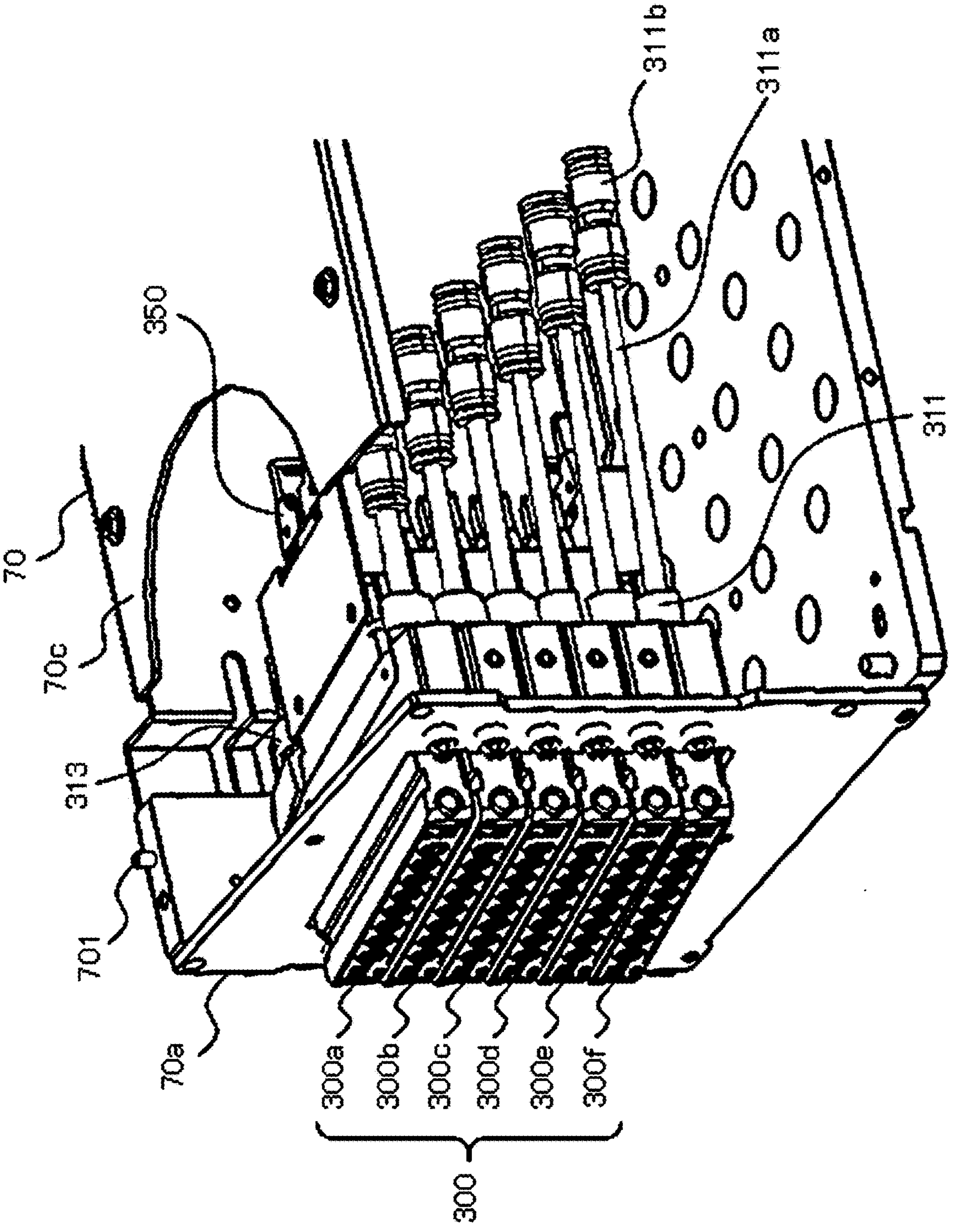
FIG. 6 is a perspective view of a part of the head holder.

FIG. 6 is a perspective view of a part of the head holder 70 according to the present embodiment. In FIG. 6, the upper cover 70*b* is detached from the frame 70*c* of the head holder 70, and the screws 708 that secure the head fixing plate 70*a* to the frame 70*c* are removed, Here, in order to depict the interior of the head holder 70, the side plate of the frame 70*c* is omitted. The interior of the head holder 70 is actually exposed only through the portion trout which the upper cover 70*b* is removed.

Each of the heads 300 attached to the head fixing plate 70*a* includes an ink supply tube 311*a* to supply ink to the supply port 311 and the connector 350 to transmit and receive electric signals for drive control of each head 300. Each of the heads 300*a* to 300*f* further includes the collection port 313 and an ink collection tube 313*a* (see FIG. 7A) on a side opposite to the supply port 311 to collect ink. Here, the ink supply tube 311*a* and the ink collection tube 313*a* are examples of a liquid conveyor.

The ink supply tubes 311*a* of the heads 300 are coupled to tubes connected to respective liquid containers mounted on the carriage 1 via respective couplings 311*b*. The liquid container stores ink to be supplied to each of the multiple heads 300*a* to 300*f*. The coupling 311*b* can couple and decouple the ink supply tube 311*a* and the liquid container by one touch. In the present embodiment, as illustrated in FIG. 6, in the multiple heads 300*a* to 300*f* secured to the head fixing plate 70*a*, the distance between the coupling 311*b* and the corresponding head 300 increases in the order from the top head 300*a* toward the bottom head 300*f*. That is, in the heads 300*a* to 300*f* stacked one on another, the ink supply tube 311*a* of the head 300*b* is longer than the ink supply tube 311*a* of the head 300*a*, and the ink supply tube 311*a* of the head 300*c* is longer than the ink supply tube 311*a* of the head 300*b*.

As described above, the liquid discharge apparatus 1000 according to the present embodiment includes the head holder 70, the head fixing plate 70*a*, the multiple heads 300*a* to 300*f*, and the multiple couplings 311*b*. The head fixing plate 70*a* is detachably attached to the head holder 70 The multiple heads 300 are secured to the head fixing plate 70*a* and arranged side by side in a vertical arrangement direction. The multiple heads 300 include the respective ink supply tubes 311*a*. The couplings 311*b* couple the respective ink supply tubes 311*a* and respective liquid containers. One of the ink supply tubes 311*a* of a lower one of the multiple heads 300*a* to 300*f* is longer in a direction intersecting the vertical arrangement direction than another one of the ink supply tubes 311*a* of upper one of the multiple heads 300*a* to 300*f* above the lower one when the head holder 70 holds the head fixing plate 70*a*.

Here, for example, even if all the couplings 311*b* are disposed close to the corresponding head 300, the couplings 311*b* can be decoupled. However, as described above, the distance between the coupling 311*b* and the corresponding head 300 increases in the order from the top head 300*a* toward the bottom head 300*f*. Therefore, the upper coupling 311*b* does not overlap the lower coupling 311*b* or partially overlaps the lower coupling 311*b* in the vertical direction. That is, the upper coupling 311*b* does not completely overlap the lower coupling 311*b* in the vertical direction, Therefore, an operator can easily see the couplings 311*b*, thereby facilitating the operator coupling and decoupling the ink supply tubes 311*a* and the couplings 311*b*. In addition, since the lower coupling 311*b* is separated far from the corresponding lower head 300 as compared with the upper coupling 311*b* and the corresponding upper head 300, when the head fixing plate 70*a* is opened from the head holder 70, the lower coupling 311*b* is pushed out upward, so that the operator can easily couple and decouple the coupling 311*b*.

Accordingly, a liquid discharge apparatus can be provided in which the coupling 311*b* between the head 300 and the carriage 1 is exposed when the head 300 is attached and detached, and the head 300 is easily attached to and detached from the carriage 1.

In the present embodiment, the head holder 70 includes the upper cover 70*b* that is closably openable. The upper cover 70*b* is disposed facing the top head 300*a* of the multiple heads 300*a* to 300*f* secured to the head fixing plate 70*a*, The coupling 311*b* coupled to the top head 300*a* is exposed when the upper cover 70*b* is open. This configuration facilitates an operator accessing the coupling 311*b*.

Further, in the present embodiment, the coupling 311*b* is operable by one touch. Accordingly, the ink supply tube 311*a* can be easily coupled to and decoupled from the coupling 311*b*.

Similarly to the coupling 311*b*, the distance between the connector 350 described above and the corresponding head 300 may increase in the order from the top head 300*a* toward the bottom head 300*f*. Alternatively, when the connectors 350 are disposed at the same position for each head 300 without changing the distance between the connector 350 and the corresponding head 300, the length of a communication cable 350*a* (see FIG. 8) increases in the order from the top head 300*a* toward the bottom head 300*f*. Here, the communication cable 350*a* is an example of a transmitter.

As described above, in the present embodiment, the heads 300 include the respective connectors 350 and the respective communication cables 350*a*. The connectors 350 are connected to a connection terminal 1*a* (see FIG. 8) of the carriage 1 via the respective communication cables 350*a*, One communication cable 350*a* of the lower head 300 of the multiple heads 300 is longer than another communication cable 350*a* of the upper head 300 of the multiple heads 300 above the lower head 300 when the head holder 70 holds the head fixing plate 70*a*. Accordingly, the communication cables 350*a* can also follow the movement of the head fixing plate 70*a* when the head fixing plate 70*a* is opened with respect to the head holder 70.

Figure 7A:
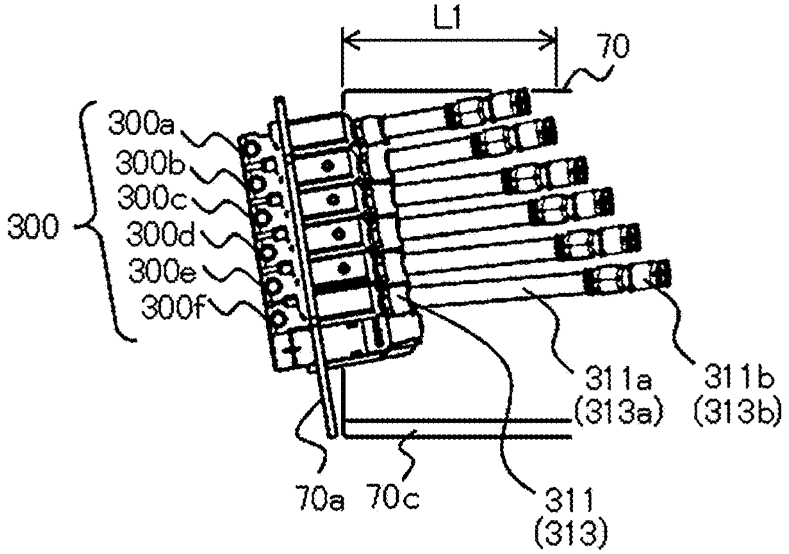
FIGS. 7A to 7C are schematic views of the head holder when the head is detached.
Figure 7B:
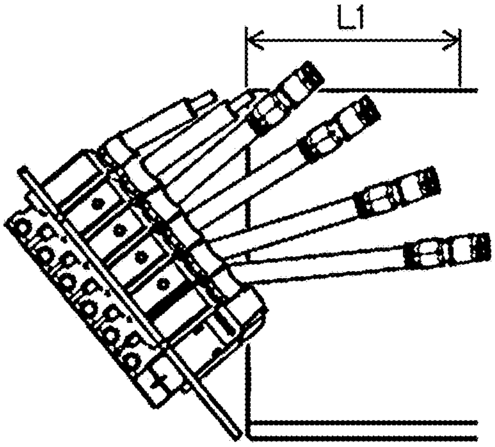
Figure 7C:
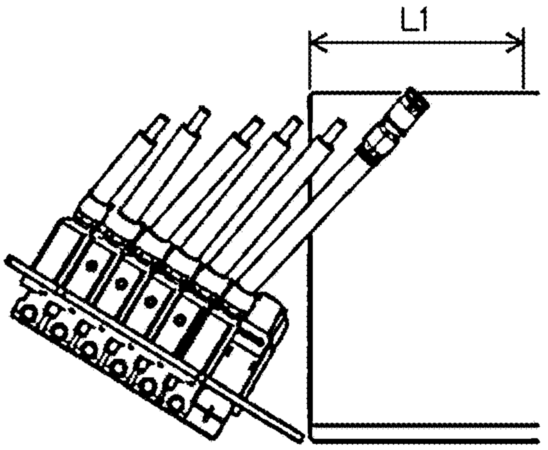

FIGS. 7A to 7C are schematic views of the head holder 70 when the head 300 is detached. When the head fixing plate 70*a* to which the heads 300 are secured is detached from the head holder 70, an operator moves the head holder 70 in the Z-axis direction relative to the carriage 1 to a position where the upper cover 70*b* can be removed as illustrated in FIG. 2. Next, the operator removes the screws 708, which secure the upper cover 70*b* and the head fixing plate 70*a* to the frame 70*c*, from the head holder 70 and removes the upper cover 70*b*. As a result, the operator can visually recognize the coupling 311*b* of the top head 300*a* located at the uppermost position through an opening L1 on the upper surface of the head 300.

In this state, the operator can access the coupling 311*b* of the head 300*a* through the opening L1 and decouple the ink supply tube 311*a* from the coupling 311*b*, Since the coupling 311*b* is operable by one touch, the operator can decouple the coupling 311*b* front the ink supply tube 311*a* at the position where the operator accesses. After decoupling the coupling 311*b* from the head 300*a*, the operator slightly pulls out the head fixing plate 70*a* as illustrated in FIG. 7A.

As described above, the length of the ink supply tube 311*a* increases in the order from the top head 300*a* toward the bottom head 300*f*, and the distance between the coupling 311*b* and the corresponding head 300 increases in the order from the top head 300*a* toward the bottom head 300*f*. Therefore, as the screws 708 are removed and the head fixing plate 70*a* is unfixed, the head fixing plate 70*a* can be swung due to the flexibility and the difference in the lengths of the ink supply tubes 311*a*.

After decoupling the couplings 311*b* from the ink supply tubes 311*a* of the head 300*a* and the head 300*b*, the operator can further open (pull out) the head fixing plate 70*a*. Thus, as illustrated in FIG. 713, the couplings 311*b* of the head 300*c* and the head 300*d* are exposed through the opening L1. In this state, the operator can access the couplings 311*b* of the head 300*c* and the head 300*d* through the opening L1 and decouple the ink supply tubes 311*a* from the couplings 311*b*.

Thus, while swinging the head fixing plate 70*a*, the operator decouples the couplings 311*b* in the order from top to bottom. As the number of couplings 311*b* coupled to the ink supply tubes 311*a* decreases, the range where the bead fixing plate 70*a* is swingable also increases.

After decoupling; the couplings 311*b* from the ink supply tubes 311*a* of the head 300*c* and the head 300*d*, the operator can further open (pull out) the head fixing plate 70*a*. Thus, as illustrated in FIG. 7C, the couplings 311*b* of the head 300*e* and the head 300*f* are exposed through the opening L1 In this state, the operator can access the couplings 311*b* of the head 300*e* and the head 300*f* through the opening L1 and decouple the ink supply tubes 311*a* from the couplings 311*b*.

Ink collection tubes 313*a* and couplings 313*b* have the same configuration as the ink supply tubes 311*a* and the couplings 311*b*, and the operator performs the same operation described above on the ink collection tubes 313*a* connected to the collection ports 313 and the couplings 313*b*, When the head fixing plate 70*a* is attached to the head holder 70, the operator couples the ink supply tubes 311*a* and the couplings 311*b*, and the ink collection tubes 313*a* and couplings 313*b* in the reverse procedure when the head fixing plate 70*a* is detached.

Figure 8:
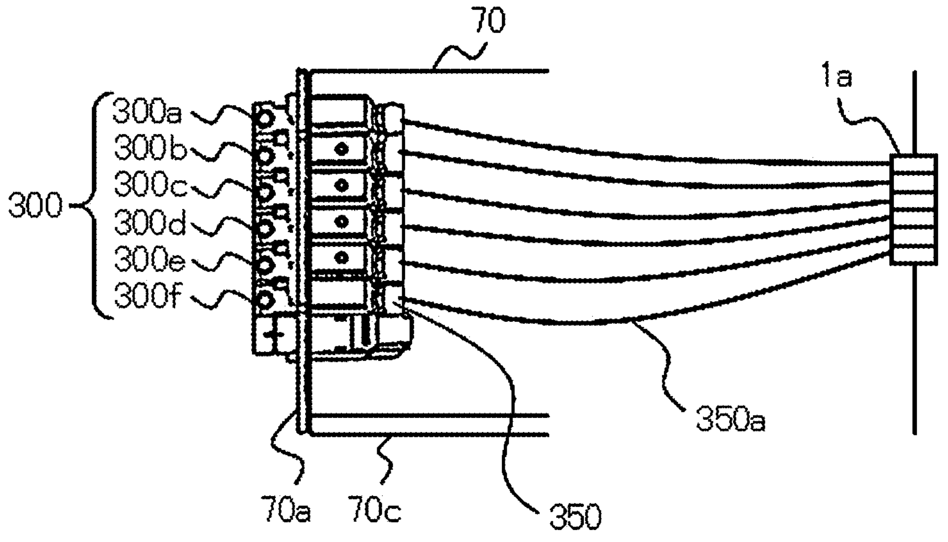
FIG. 8 is a schematic view of a connector and a communication cable according to as embodiment of the present disclosure.

FIG. 8 is a schematic view illustrating an example of connection between the connectors 350 and the communication cables 350*a*. The connectors 350 of the heads 300*a* to 300*f* are connected to, for example, the connection terminal 1*a* on the carriage 1 via the communication cables 350*a*. The length of the communication cable 350*a* increases in the order from the top head 300*a* toward the bottom head 300*f*. As illustrated in FIG. 8, the communication cable 350*a* corresponding to the lower head 300 is slacker (i.e., longer) than the communication cable 350*a* corresponding, to the upper head 300 above the lower head 300 when the head fixing plate 70*a* is secured to the frame 70*c*. As a result, while swinging the head fixing plate 70*a* as illustrated in FIGS. 7A to 7C, the operator can disconnect the communication cables 350*a* from the connectors 350.

The above-described embodiments are examples and, for example, the following aspects 1 to 4 of the present disclosure can provide the following advantages.

Aspect 1

According to Aspect 1, A liquid discharge apparatus (the liquid discharge apparatus 1000) includes a holder (the head holder 70), a fixing member (the head fixing plate 70*a*), multiple liquid dischargers (the heads 300*a* to 300*f*), and multiple couplings (the couplings 311*b* and 313*b*), The fixing member is detachably attached to the holder. The multiple liquid dischargers are secured to the fixing member and arranged side by side in a vertical arrangement direction. The multiple liquid dischargers include respective liquid conveyors (the ink supply tubes 311*a* and the ink collection tubes 313*a*) The couplings couple the respective liquid conveyors and respective liquid container. One of the liquid conveyors of a lower one of the multiple liquid dischargers is longer in a direction intersecting the vertical arrangement direction than another one of the liquid conveyors of an upper one of the multiple liquid dischargers above the lower one.

According to Aspect 1, the liquid discharge apparatus can be provided in which the coupling between the liquid conveyor of the liquid discharger and the liquid discharge unit is exposed when the liquid discharger is attached and detached, and the liquid discharger is easily attached to and detached from the liquid discharge unit such as the carriage.

Aspect 2

According to Aspect 2, in Aspect 1, the holder (the head holder 70) includes a cover (the upper cover 70*b*) disposed facing a top one (the head 300*a*) of the multiple liquid dischargers (the heads 300*a* to 300*f*). The cover is closably operable and the coupling (the couplings 311*b* and 313*b* coupled to the top one is exposed when the cover is open.

According to Aspect 2, an operator can easily access the coupling because the coupling is exposed.

Aspect 3

According to Aspect 3, in Aspect 1 or 2, the coupling (the coupling 311*b* and 313*b*) is operable by one touch to couple and decouple the liquid conveyor and the liquid container.

According to Aspect 3, the liquid conveyor, such as the ink supply tube 311*a* and the ink collection tube 313*a*, can be easily coupled to and decoupled from the coupling.

Aspect 4

According to Aspect 4, in any one of Aspects 1 to 3, the liquid discharge apparatus further includes a connection terminal (the connection terminal 1*a*). The multiple liquid dischargers (the heads 300*a* to 300*f*) further includes respective connectors (the connectors 350) and respective transmitters (the communication cables 350*a*). The connectors are connected to the connection terminal via the respective transmitters. One of the transmitters of the lower one is longer than another one of the transmitters of the upper one.

According to Aspect 4, the transmitter can also follow the movement of the fixing member when the fixing member is opened with respect to the holder.

As described above, according to the present disclosure, a liquid discharge apparatus can be provided in which the coupling between the liquid discharger and the liquid discharge unit is exposed when the liquid discharger is attached and detached, and the liquid discharger is easily attached and detached.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. A liquid discharge apparatus comprising:

a holder;

liquid dischargers secured relative to the holder, the liquid dischargers being arranged side by side in a vertical arrangement direction, the liquid dischargers to discharge liquid in a discharge direction; and liquid conveyors respectively corresponding to the liquid dischargers; and couplings for coupling the respective liquid conveyors, wherein one of the liquid conveyors of a lower one of the liquid dischargers is longer in a direction intersecting the vertical arrangement direction than another one of the liquid conveyors of an upper one of the liquid dischargers above the lower one of the liquid dischargers, wherein:

during a removal of the liquid dischargers from the holder, the liquid conveyors remain connected to the liquid dischargers due to a flexibility and a difference in length of the liquid conveyors, and all portions of each of the liquid conveyors extend in a direction generally parallel to the discharge direction.

2. The liquid discharge apparatus according to claim 1, wherein the holder includes a cover disposed facing a top one of the liquid dischargers, the cover being closably openable, and wherein the coupling coupled to the top one is exposed when the cover is open.

3. The liquid discharge apparatus according to claim 1, wherein the coupling is operable by one touch to couple the liquid conveyor and the liquid container.

4. The liquid discharge apparatus according to claim 1, further comprising a connection terminal, wherein the liquid dischargers further include respective connectors and respective transmitters, the connectors connected to the connection terminal via the respective transmitters, wherein one of the transmitters of the lower one of the liquid dischargers is longer than another one of the transmitters of the upper one of the liquid dischargers.

5. The liquid discharge apparatus according to claim 1, wherein:

the couplings couple the liquid conveyors to liquid containers.

6. The liquid discharge apparatus according to claim 1, further comprising:

a connector detachably attached to the holder, wherein the liquid dischargers are secured relative to the holder using the connector.

7. The liquid discharge apparatus according to claim 6, wherein:

the connector is a fixing member.

8. The liquid discharge apparatus according to claim 1, wherein:

when the liquid dischargers and the liquid conveyors are swung during removal of the liquid discharges and the liquid conveyors from the holder, the lower one of the liquid dischargers is no longer generally parallel to the discharge direction.

9. The liquid discharge apparatus according to claim 1, wherein:

the one of the liquid conveyors of the lower one of the liquid dischargers is longer than the another one of the liquid conveyors of the upper one of the liquid dischargers so that the liquid dischargers and the liquid conveyors are swung during removal of the liquid dischargers and the liquid conveyors from the holder.

10. A liquid discharge apparatus comprising:

a holder;

liquid dischargers secured relative to the holder, the liquid dischargers being arranged side by side in a vertical arrangement direction, the liquid dischargers to discharge liquid in a discharge direction; and liquid conveyors respectively corresponding to the liquid dischargers, the liquid conveyors being entirely linear; and couplings for coupling the respective liquid conveyors, wherein one of the liquid conveyors of a lower one of the liquid dischargers is longer in a direction intersecting the vertical arrangement direction than another one of the liquid conveyors of an upper one of the liquid dischargers above the lower one of the liquid dischargers, and wherein all portions of each of the liquid conveyors extend in a direction generally parallel to the discharge direction.

11. The liquid discharge apparatus according to claim 10, wherein:

the couplings coupling the liquid conveyors to liquid containers.

12. The liquid discharge apparatus according to claim 10, further comprising:

a connector detachably attached to the holder, wherein the liquid dischargers are secured relative to the holder using the connector.

13. The liquid discharge apparatus according to claim 12, wherein:

the connector is a fixing member.

14. The liquid discharge apparatus according to claim 10, wherein:

when the liquid dischargers and the liquid conveyors are swung during removal of the liquid discharges and the liquid conveyors from the holder, the lower one of the liquid chargers is no longer generally parallel to the discharge direction.

15. The liquid discharge apparatus according to claim 10, wherein:

the one of the liquid conveyors of the lower one of the liquid dischargers is longer than the another one of the liquid conveyors of the upper one of the liquid dischargers so that the liquid dischargers and the liquid conveyors are swung during removal of the liquid discharges and the liquid conveyors from the holder.

16. The liquid discharge apparatus according to claim 10, wherein:

all portions of each of the liquid conveyors extending in a direction generally parallel to the discharge direction.

* * * * *